(12) United States Patent
Huang et al.

(10) Patent No.: US 12,216,509 B2
(45) Date of Patent: Feb. 4, 2025

(54) PORTABLE ELECTRONIC DEVICE

(71) Applicants: Acer Incorporated, New Taipei (TW); Sinher Technology Inc., New Taipei (TW)

(72) Inventors: Yi-Ta Huang, New Taipei (TW); Cheng-Nan Ling, New Taipei (TW); Chih-Chun Liu, New Taipei (TW); Yung-Chang Chiang, New Taipei (TW)

(73) Assignees: Acer Incorporated, New Taipei (TW); Sinher Technology Inc., New Taipei (TW)

( * ) Notice: Subject to any disclaimer, the term of this patent is extended or adjusted under 35 U.S.C. 154(b) by 0 days.

(21) Appl. No.: 18/501,055

(22) Filed: Nov. 3, 2023

(65) Prior Publication Data
US 2024/0069606 A1    Feb. 29, 2024

Related U.S. Application Data

(63) Continuation of application No. 17/834,951, filed on Jun. 8, 2022, now Pat. No. 11,847,000.

(30) Foreign Application Priority Data

Dec. 30, 2021  (TW) ................. 110149602
Dec. 30, 2021  (TW) ................. 110149603

(51) Int. Cl.
| | | |
|---|---|---|
| G06F 1/16 | (2006.01) |
| F16C 11/04 | (2006.01) |
| E05D 3/12 | (2006.01) |
| E05D 3/18 | (2006.01) |

(52) U.S. Cl.
CPC ............ *G06F 1/1681* (2013.01); *F16C 11/04* (2013.01); *G06F 1/1616* (2013.01); *E05D 3/122* (2013.01); *E05D 3/18* (2013.01); *E05Y 2999/00* (2024.05)

(58) Field of Classification Search
CPC ..... G06F 1/1681; F16C 11/04; E05Y 2999/00
See application file for complete search history.

(56) References Cited

U.S. PATENT DOCUMENTS

| | | |
|---|---|---|
| 5,102,084 A | 4/1992 | Park |
| 9,740,253 B2 | 8/2017 | Cheng et al. |
| 10,174,535 B2 | 1/2019 | Lin et al. |
| 10,281,951 B2 | 5/2019 | Vic et al. |
| 10,627,874 B2 | 4/2020 | Lin et al. |
| 10,876,337 B2 | 12/2020 | Lin et al. |
| 10,890,949 B2 | 1/2021 | Ou et al. |
| 10,908,653 B2 | 2/2021 | Huang et al. |
| 11,016,528 B2 | 5/2021 | Lin et al. |

(Continued)

*Primary Examiner* — Lisa Lea-Edmonds
(74) *Attorney, Agent, or Firm* — JCIPRNET

(57) ABSTRACT

A portable electronic device including a first body, a second body, and a hinge mechanism is provided. The second body is connected to the first body through the hinge mechanism, and the hinge mechanism has a basis axis located at the first body and a rotation axis located at a lower end of the second body. When the second body rotates with respect to the first body, the rotation axis slides along an arc shaped path with respect to the basis axis to increase or decrease a distance between the rotation axis and the basis axis and increase or decrease a distance between the lower end of the second body and a back end of the first body.

18 Claims, 6 Drawing Sheets

(56) References Cited

U.S. PATENT DOCUMENTS

| | | |
|---|---|---|
| 11,093,008 B2 | 8/2021 | Hallar et al. |
| 11,216,044 B2 | 1/2022 | Ou et al. |
| 11,259,428 B2 | 2/2022 | Kang et al. |
| 11,266,030 B2 | 3/2022 | Kim et al. |
| 11,500,428 B2 * | 11/2022 | Huang ................ G06F 1/1616 |
| 11,609,615 B2 * | 3/2023 | Huang .................... E05D 7/00 |
| 11,652,277 B2 * | 5/2023 | Huang ................ H01Q 1/243 |
| | | 361/679.01 |
| 11,726,531 B2 | 8/2023 | Tsai et al. |
| 11,847,000 B2 * | 12/2023 | Huang ................... F16C 11/04 |
| 2014/0009874 A1 | 1/2014 | Huang |
| 2017/0153677 A1 | 6/2017 | Cheng et al. |
| 2017/0235337 A1 | 8/2017 | Vic et al. |
| 2018/0136699 A1 | 5/2018 | Chen et al. |
| 2018/0230724 A1 | 8/2018 | Lin et al. |
| 2018/0239394 A1 | 8/2018 | Vic et al. |
| 2019/0250674 A1 | 8/2019 | Lin et al. |
| 2020/0012323 A1 | 1/2020 | Huang et al. |
| 2020/0080357 A1 | 3/2020 | Lin et al. |
| 2020/0117245 A1 | 4/2020 | Ou et al. |
| 2020/0183451 A1 | 6/2020 | Lin et al. |
| 2020/0329569 A1 | 10/2020 | Kim et al. |
| 2020/0383220 A1 | 12/2020 | Kang et al. |
| 2021/0081004 A1 * | 3/2021 | Huang ................ G06F 1/1681 |
| 2021/0081005 A1 * | 3/2021 | Huang ................ G06F 1/1618 |
| 2021/0096607 A1 | 4/2021 | Hallar et al. |
| 2021/0109572 A1 | 4/2021 | Ou et al. |
| 2021/0149455 A1 * | 5/2021 | Huang ................ G06F 1/1616 |
| 2021/0151857 A1 * | 5/2021 | Huang ................ G06F 1/1616 |
| 2021/0255671 A1 * | 8/2021 | Huang ................ G06F 1/1681 |
| 2021/0277693 A1 * | 9/2021 | Güzeltepe ............ E05D 7/0407 |
| 2022/0269315 A1 | 8/2022 | Tsai et al. |
| 2023/0014585 A1 | 1/2023 | Tang |
| 2023/0068228 A1 | 3/2023 | Sanchez et al. |
| 2023/0213982 A1 * | 7/2023 | Huang ................ G06F 1/1616 |
| | | 361/679.27 |
| 2023/0229202 A1 * | 7/2023 | Huang ................ G06F 1/1681 |
| | | 361/679.55 |
| 2024/0069606 A1 * | 2/2024 | Huang .................. F16C 11/04 |

* cited by examiner

PORTABLE ELECTRONIC DEVICE

CROSS-REFERENCE TO RELATED APPLICATION

This application is a continuation application of and claims the priority benefit of U.S. application Ser. No. 17/834,951, filed on Jun. 8, 2022, now allowed, which claims the priority benefit of Taiwan application serial no. 110149602, filed on Dec. 30, 2021, and Taiwan application serial no. 110149603, filed on Dec. 30, 2021. The entirety of each of the above-mentioned patent applications is hereby incorporated by reference herein and made a part of this specification.

BACKGROUND

Technical Field

The disclosure relates to an electronic device, and particularly relates to a portable electronic device.

Related Art

As the computing power of notebook computers continues to grow, the amount of heat generated by the electronic components inside them (such as central processing units, graphics processors, or other electronic components) during operation is also increasing. Once the heat is not quickly discharged to the outside, the performance of a notebook computer is likely to decline due to overheating.

Generally speaking, a notebook computer is composed of a first body and a second body that are pivotally connected to each other, wherein the first body is capable of logical operations and data access, and the second body is capable of image display. Furthermore, heat sources (such as central processing units, graphics processors, or other electronic components) are mostly located inside the first body, and the back end of the first body is provided with a heat dissipation opening, such that the hot air is discharged from the inside of the first body to the outside through the heat dissipation opening. Because the lower end of the second body is pivotally connected to the back end of the first body, after the second body rotates and unfolds with respect to the first body, the lower end of the second body moves closer to the back end of the first body and blocks the path for the hot air to be discharged to the outside, resulting in poor heat dissipation efficiency.

SUMMARY

The disclosure provides a portable electronic device having excellent heat dissipation efficiency.

The disclosure provides a portable electronic device, which includes a first body, a second body, and a hinge mechanism. The hinge mechanism includes a first axis fixed in the first body; a first gear fixed to the first axis; a first gear set engaged with the first gear; a gear rack rotatably connected to the first axis; a bracket slidably connected to the gear rack; a second axis fixedly connected to a lower end of the second body and rotatably connected to the bracket; a second gear fixed to the second axis; and a second gear set engaged with the second gear and the gear rack. The bracket includes a gear rack portion parallel to the gear rack, and the first gear set is engaged with the gear rack portion. When the second axis rotates with the second body with respect to the first body, the second gear drives the second gear set to rotate, and the second gear set slides with respect to the gear rack, such that the second axis slides along an arc shaped path with respect to the first axis so as to increase or decrease a distance between the second axis and the first axis, and to increase or decrease a distance between the lower end of the second body and a back end of the first body.

The disclosure provides another portable electronic device, which includes a first body, a second body, and a hinge mechanism. The second body is connected to the first body through the hinge mechanism, and the hinge mechanism includes a basis axis located on the first body and a rotation axis located on a lower end of the second body. When the second body rotates with respect to the first body, the rotation axis slides along an arc shaped path with respect to the basis axis so as to increase or decrease a distance between the rotation axis and the basis axis, and to increase or decrease a distance between the lower end of the second body and a back end of the first body.

Based on the above, while the second body rotates with respect to the first body, the second body slides with respect to the first body to adjust the distance between the lower end of the second body and the back end of the first body. Furthermore, when the second body rotates and unfolds with respect to the first body through the hinge mechanism, the lower end of the second body slides away from the back end of the first body to prevent the lower end of the second body from blocking the heat dissipation path located on the back end of the first body (that is, the path through which the hot air inside the first body is discharged to the outside), such that the hot air is quickly discharged from the inside of the first body to the outside. Therefore, the portable electronic device of the disclosure has excellent heat dissipation efficiency.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
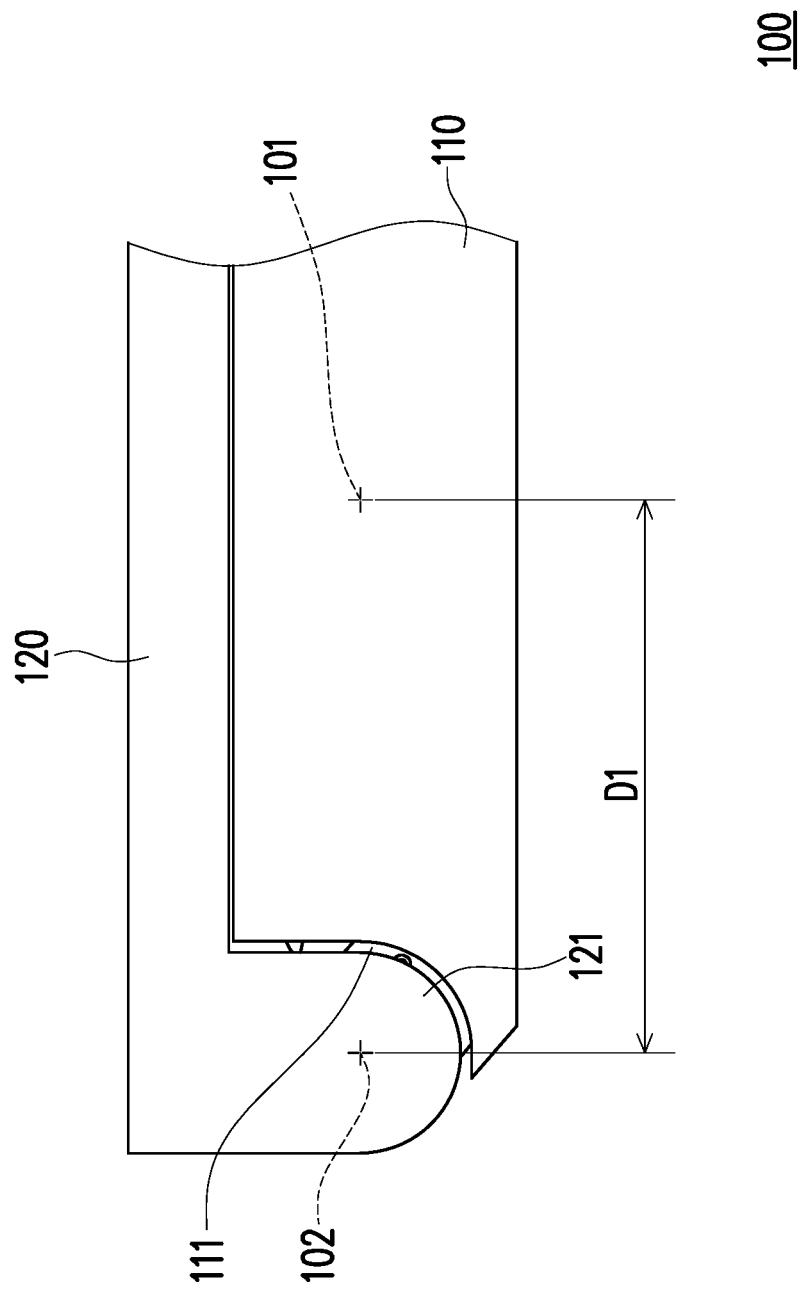
FIG. 1A is a partial schematic side view of a portable electronic device in a closed state according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 1B:
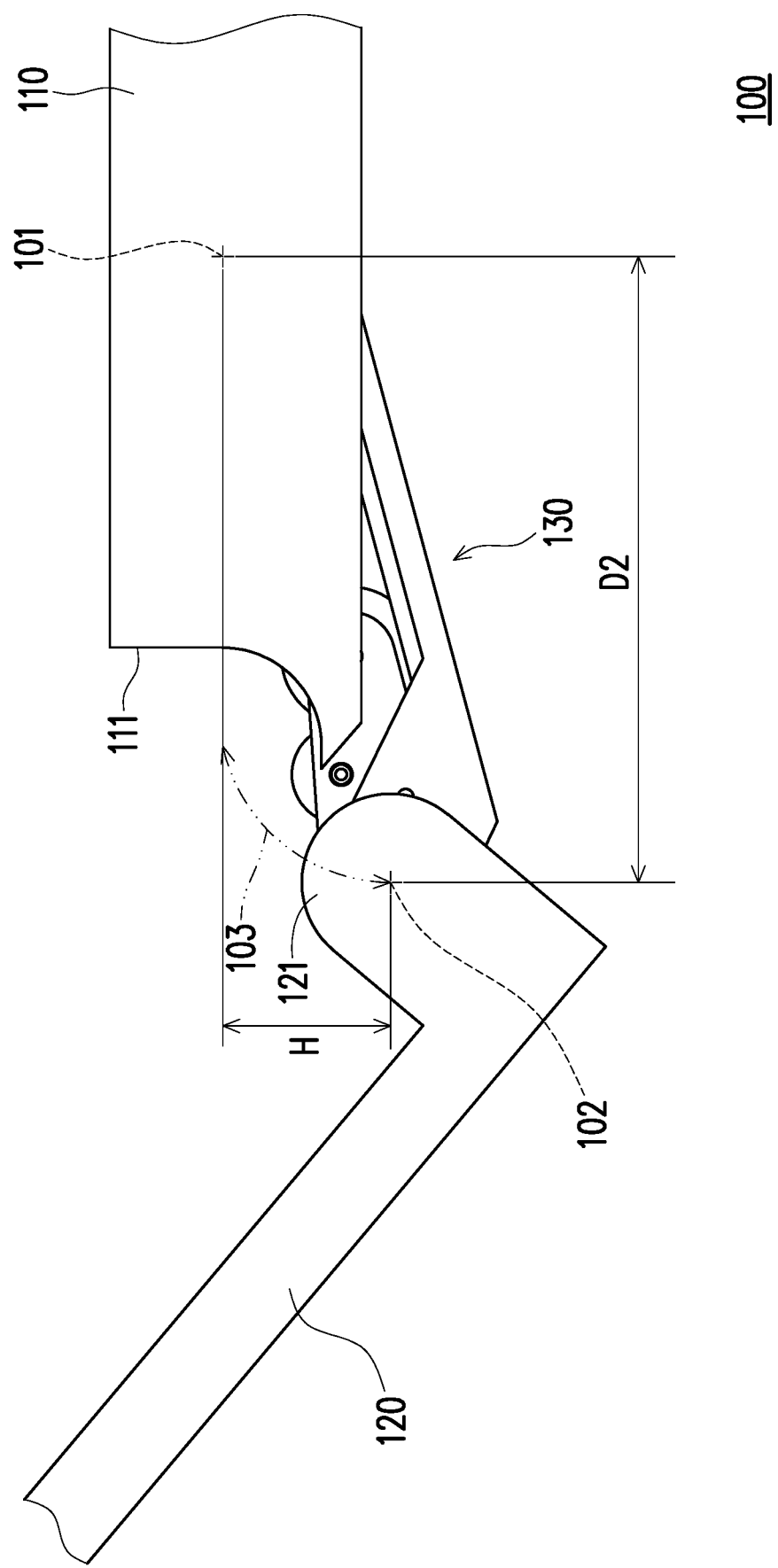
FIG. 1B is a partial schematic side view of the portable electronic device of FIG. 1A transitioned to an unfolded state.

FIG. 1A is a partial schematic side view of a portable electronic device in a closed state according to an embodiment of the disclosure. FIG. 1B is a partial schematic side view of the portable electronic device of FIG. 1A transitioned to an unfolded state. Referring to FIGS. 1A and 1B, in this embodiment, a portable electronic device 100 may be a notebook computer, and includes a first body 110, a second body 120, and a hinge mechanism 130. The first body 110 is capable of logical operation and data access, and the second body 120 is capable of image display. The second body 120 is connected to the first body 110 through the hinge mechanism 130, and the hinge mechanism 130 provides the freedom of movement of the second body 120 to rotate and slide with respect to the first body 110.

Furthermore, the hinge mechanism 130 has a basis axis 101 located on the first body 110 and a rotation axis 102 located on a lower end 121 of the second body 120. When the second body 120 rotates with respect to the first body 110, the rotation axis 102 rotates with the second body 120 with respect to the basis axis 101, and slides along an arc shaped path 103 with respect to the basis axis 101, to increase or decrease the distance between the rotation axis 102 and the basis axis 101, and to increase or decrease the distance between the lower end 121 of the second body 120 and a back end 111 of the first body 110.

In the closed state shown in FIG. 1A, the horizontal distance between the basis axis 101 and the rotation axis 102 is D1. In the process of transition from the closed state shown in FIG. 1A to the unfolded state shown in FIG. 1B, the rotation axis 102 slides away from the basis axis 101 along the arc shaped path 103, such that the horizontal distance between the basis axis 101 and the rotation axis 102 increases from D1 to D2. On the other hand, in the closed state shown in FIG. 1A, there is no vertical drop between the basis axis 101 and the rotation axis 102. In the process of transition from the closed state shown in FIG. 1A to the unfolded state shown in FIG. 1B, the rotation axis 102 slides away from the basis axis 101 along the arc shaped path 103 and sinks with respect to the basis axis 101, such that a vertical drop H is generated between the basis axis 101 and the rotation axis 102.

As shown in FIG. 1B, while the horizontal distance between the basis axis 101 and the rotation axis 102 increases from D1 to D2, the lower end 121 of the second body 120 slides away from the back end 111 of the first body 110 (that is, the distance between the lower end 121 of the second body and the back end 111 of the first body 110 is increased), so as to prevent the lower end 121 of the second body 120 from blocking the heat dissipation path located on the back end 111 of the first body 110 (that is, the path through which the hot air inside the first body 110 is discharged to the outside), such that the hot air is quickly discharged from the inside of the first body 110 to the outside.

In contrast, in the process of transition from the unfolded state shown in FIG. 1B to the closed state shown in FIG. 1A, the rotation axis 102 slides along the arc shaped path 103 to approach the basis axis 101, such that the horizontal distance between the basis axis 101 and the rotation axis 102 is reduced from D2 to D1. Moreover, the lower end 121 of the second body 120 slides to approach the back end 111 of the first body 110 (that is, the distance between the lower end 121 of the second body 120 and the back end 111 of the first body 110 is reduced). Finally, the lower end 121 of the second body 120 rests against the back end 111 of the first body 110.

Figure 2A:
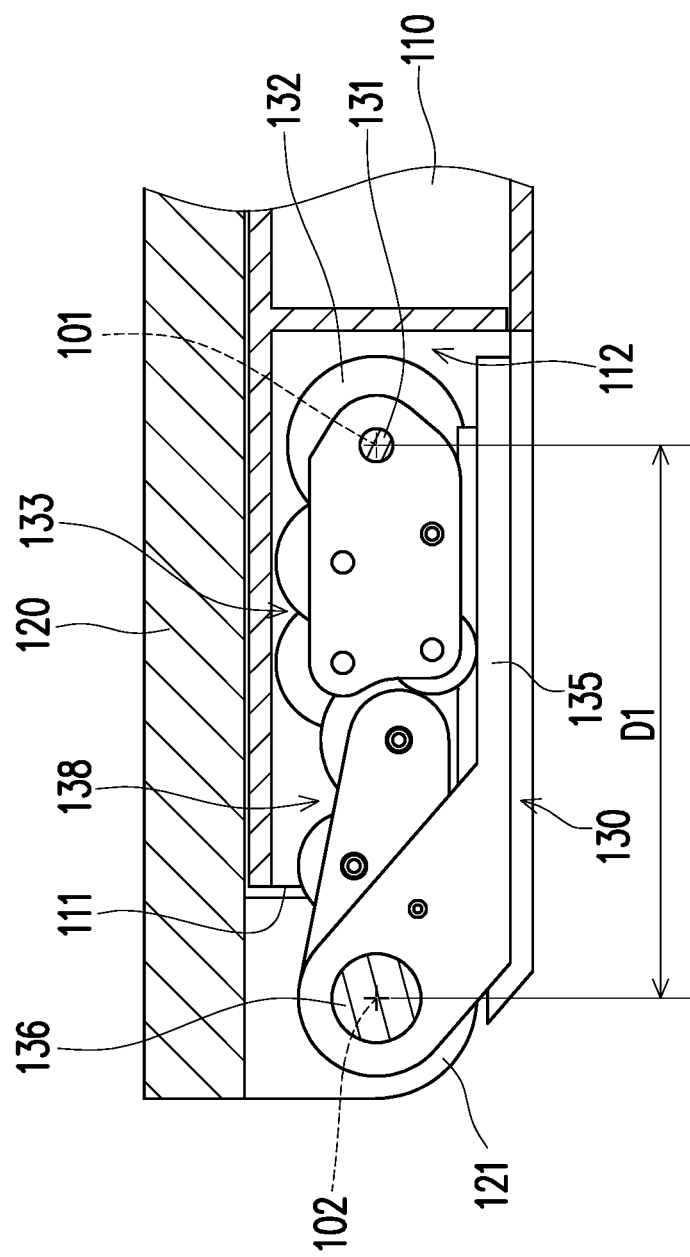
FIG. 2A is a schematic partial cross-sectional view of the portable electronic device of FIG. 1A.
Figure 2B:
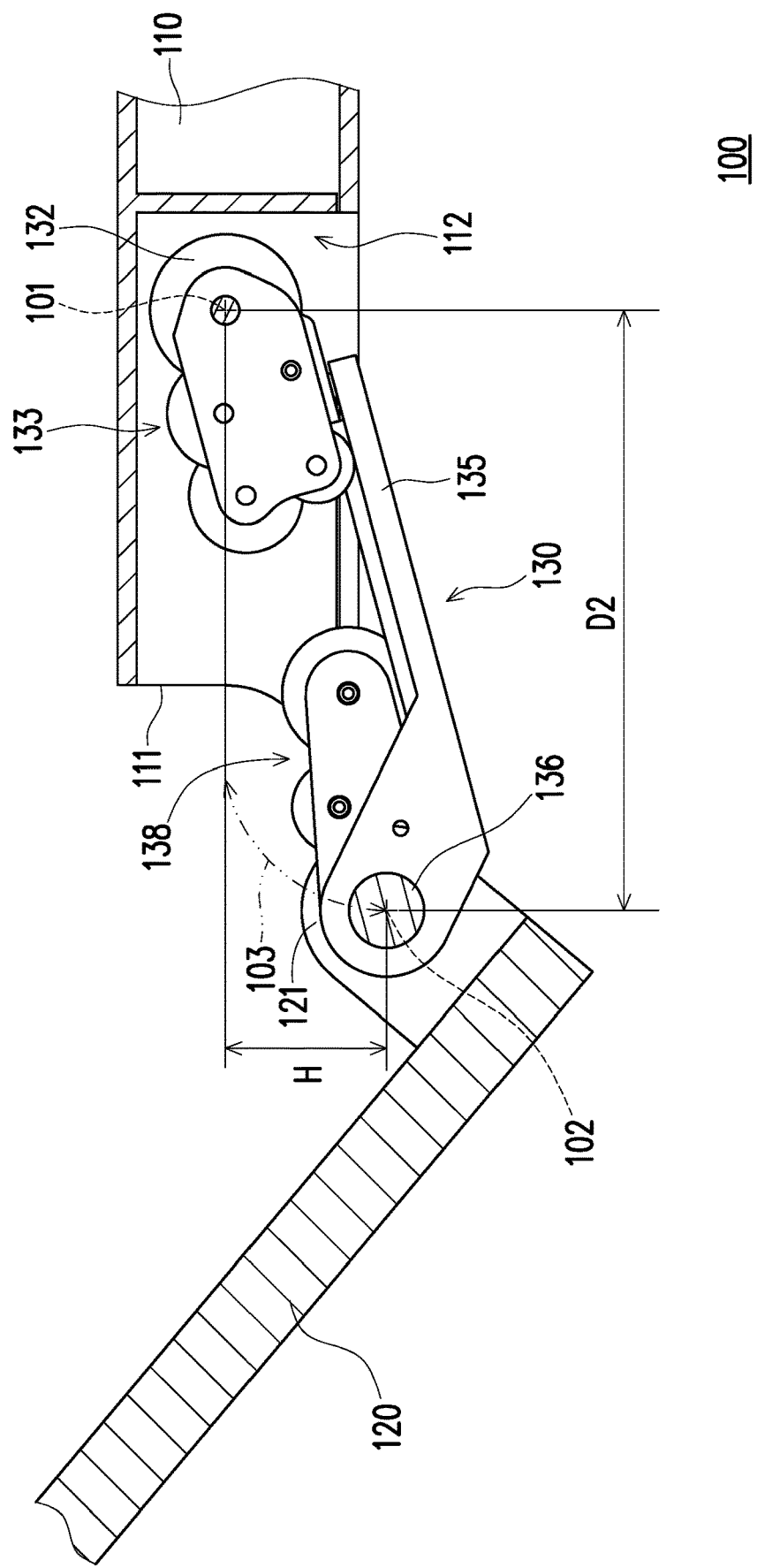
FIG. 2B is a schematic partial cross-sectional view of the portable electronic device of FIG. 1B.
Figure 3A:
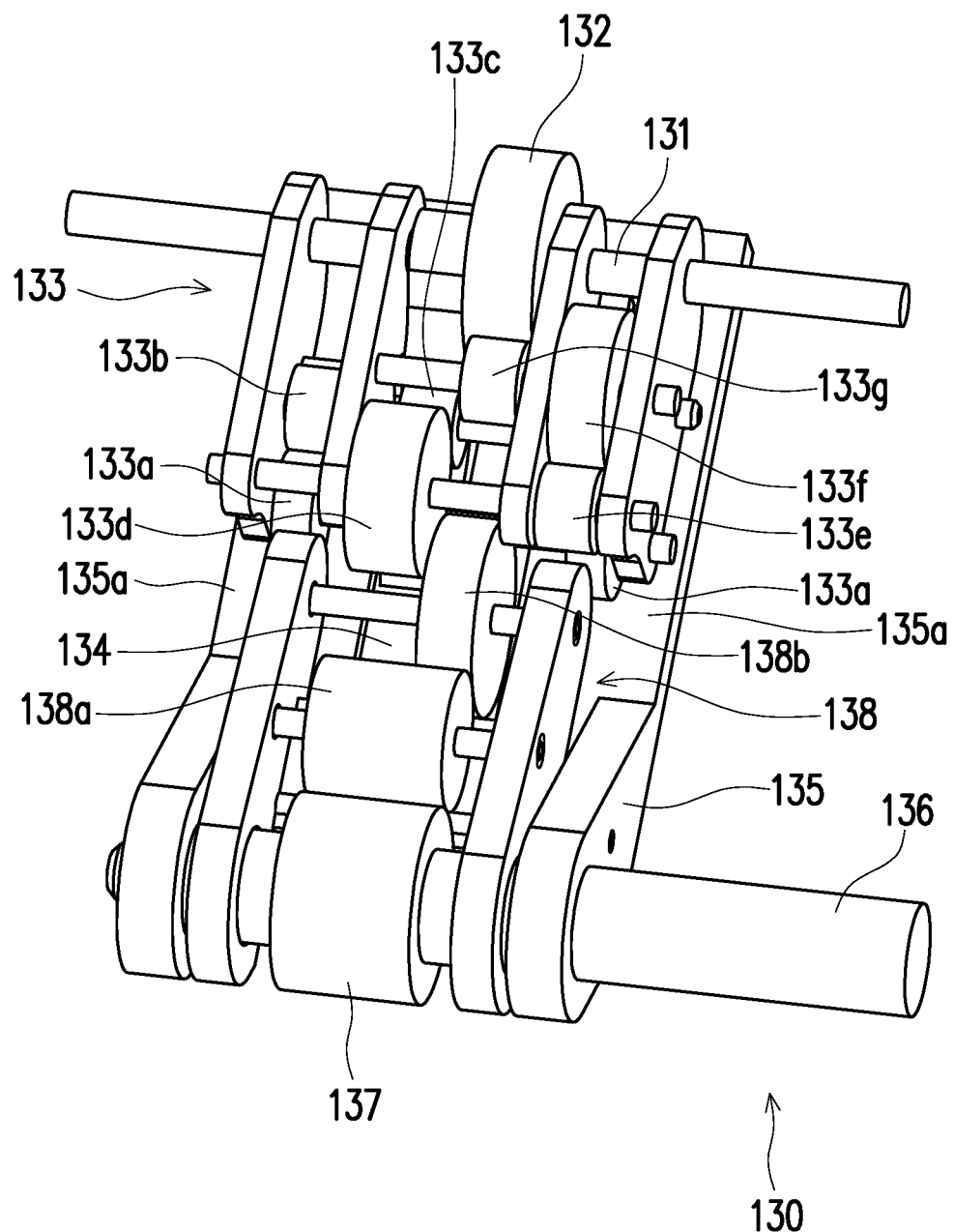
FIG. 3A is a schematic diagram of a hinge mechanism of FIG. 2A from another perspective.
Figure 3B:
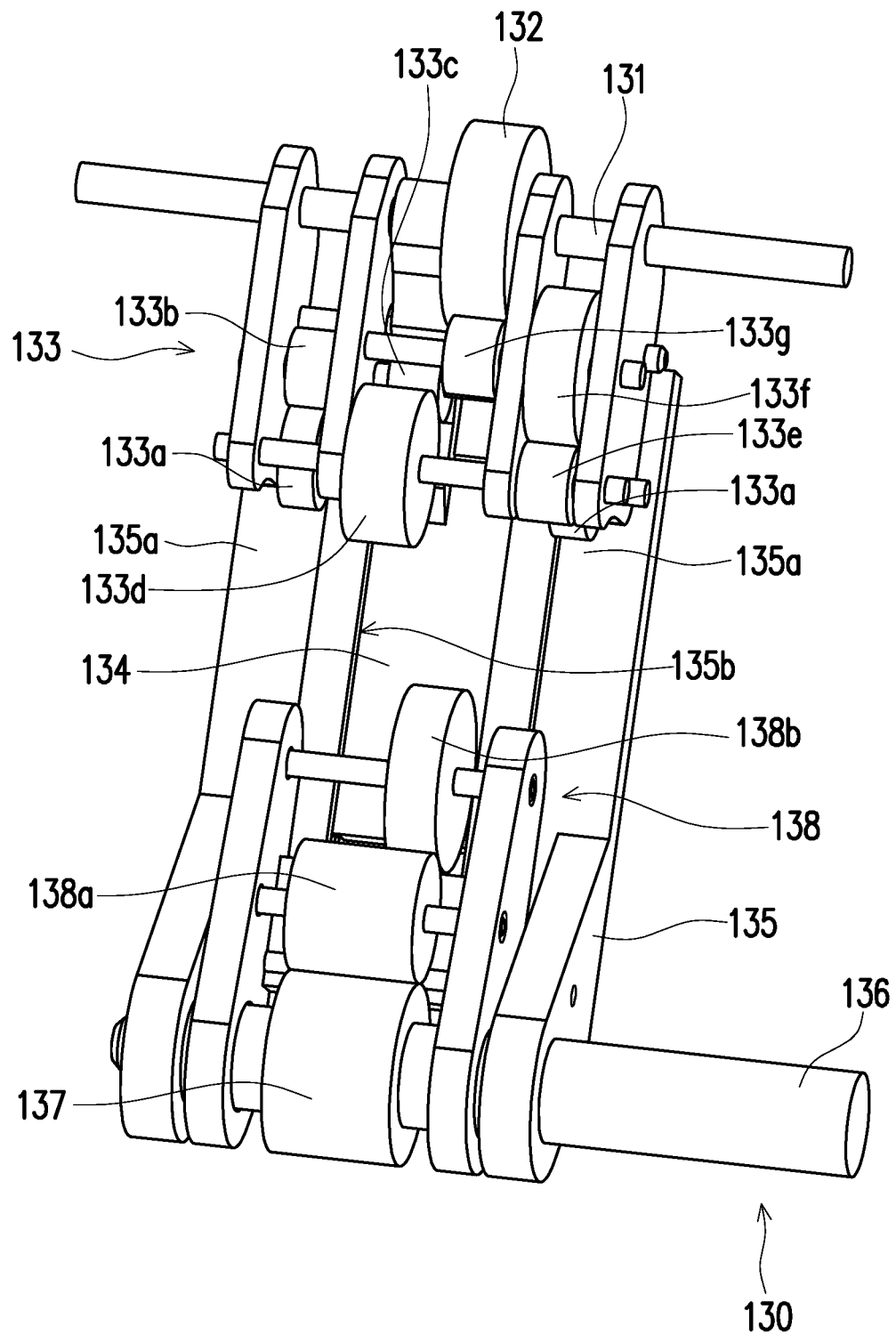
FIG. 3B is a schematic diagram of a hinge mechanism of FIG. 2B from another perspective.

FIG. 2A is a schematic partial cross-sectional view of the portable electronic device of FIG. 1A. FIG. 2B is a schematic partial cross-sectional view of the portable electronic device of FIG. 1B. FIG. 3A is a schematic diagram of a hinge mechanism of FIG. 2A from another perspective. FIG. 3B is a schematic diagram of a hinge mechanism of FIG. 2B from another perspective. Referring to FIGS. 2A to 3B, in this embodiment, the hinge mechanism 130 includes a first axis 131, a first gear 132, a first gear set 133, a gear rack 134, a bracket 135, a second axis 136, a second gear 137, and a second gear set 138. The first axis 131 is fixed in the first body 110, and the second axis 136 is fixedly connected to the lower end 121 of the second body 120. Furthermore, the first axis 131 is parallel to the second axis 136, wherein the basis axis 101 passes through the first axis 131, and the rotation axis 102 passes through the second axis 136. That is, the basis axis 101 is parallel to the rotation axis 102.

Referring to FIGS. 2A to 3B, the first gear 132 is fixed to the first axis 131, so the first axis 131 and the first gear 132 remain stationary in the first body 110. As shown in FIGS. 3A and 3B, the first gear set 133 is engaged with the first gear 132, wherein the gear rack 134 is rotatably connected to the first axis 131, and the bracket 135 is slidably connected to the gear rack 134. In detail, the bracket 135 includes a gear rack portion 135a parallel to the gear rack 134, and the first gear set 133 is engaged with the gear rack portion 135a. On the other hand, the second axis 136 is rotatably connected to the bracket 135, wherein the second gear 137 is fixed to the second axis 136, and the second gear set 138 is engaged with the second gear 137 and the gear rack 134.

When the second body 120 rotates and unfolds with respect to the first body 110, the second axis 136 and the second gear 137 rotate synchronously with the second body 120, and the second gear 137 drives the second gear set 138 to rotate, such that the second gear set 138 slides with respect to the gear rack 134. When the second gear set 138 slides with respect to the gear rack 134, the bracket 135, the second axis 136, and the second gear 137 slide synchronously with the second gear set 138, and the second axis 136 slides away from the first axis 131, such that the horizontal distance between the second axis 136 and the first axis 131 is increased from D1 to D2. Moreover, the first gear set 133, the bracket 135, the second axis 136, the second gear 137, and the second gear set 138 rotate with the gear rack 134 with respect to the first axis 131, and the second axis 136 sinks with respect to the first axis 131.

In contrast, when the second body 120 rotates and closes with respect to the first body 110, the second axis 136 and the second gear 137 rotate synchronously with the second body 120, and the second gear 137 drives the second gear set 138 to rotate, such that the second gear set 138 slides with respect to the gear rack 134. When the second gear set 138 slides with respect to the gear rack 134, the bracket 135, the second axis 136, and the second gear 137 slide synchronously with the second gear set 138, and the second axis 136 slides to approach the first axis 131, such that the horizontal distance between the second axis 136 and the first axis 131 is reduced from D2 to D1. Further, the first gear set 133, the bracket 135, the second axis 136, the second gear 137, and the second gear set 138 rotate with the gear rack 134 with respect to the first axis 131, and the second axis 136 rises with respect to the first axis 131.

That is, as the second body 120 rotates with respect to 110, the second axis 136 has a sliding amount in the horizontal direction and the vertical direction to slide along the arc shaped path 103 with respect to the first axis 131.

As shown in FIGS. 3A and 3B, when the second axis 136 slides with respect to the first axis 131, the bracket 135 slides synchronously with the second axis 136, and slides with respect to the gear rack 134 so as to drive the first gear set 133 to rotate through the gear rack portion 135a. In detail, the first gear set 133 includes a third gear 133a engaged with the gear rack portion 135a of the bracket 135, a fourth gear 133b engaged with the third gear 133a, a fifth gear 133c coaxial with the fourth gear 133b, a sixth gear 133d engaged with the fifth gear 133c, a seventh gear 133e coaxial with the sixth gear 133d, a eighth gear 133f engaged with the seventh gear 133e, and a ninth gear 133g coaxial with the eighth gear 133f. The ninth gear 133g is engaged with the first gear 132.

The second gear set 138 includes a tenth gear 138a engaged with the second gear 137 and an eleventh gear 138b engaged with the tenth gear 138a. The eleventh gear 138b is engaged with the gear rack 134. When the second gear 137 drives the tenth gear 138a to rotate, and the tenth gear 138a drives the eleventh gear 138b to rotate, the eleventh gear 138b slides with respect to the gear rack 134, and drives the bracket 135 to slide with respect to the gear rack 134, such that the gear rack portion 135a drives the third gear 133a to rotate. Furthermore, the rotation direction of the third gear 133a is opposite to the rotation direction of the eleventh gear 138b.

For example, the bracket 135 includes two gear rack portions 135a symmetrically arranged on opposite sides of the gear rack 134, and the first gear set 133 includes two third gears 133a arranged coaxially. The two gear rack portions 135a are respectively engaged with the two third gears 133a to provide sufficient driving force for the first gear set 133. In detail, one third gear 133a is engaged with the fourth gear 133b, and the other third gear 133a is not engaged with the fourth gear 133b, the fifth gear 133c, the sixth gear 133d, the seventh gear 133e, the eighth gear 133f, and the ninth gear 133g.

Referring to FIGS. 2A to 3B, the third gear 133a drives the fourth gear 133b, and the fourth gear 133b rotates synchronously with the fifth gear 133c. The fifth gear 133c drives the sixth gear 133d to rotate, and the sixth gear 133d rotates synchronously with the seventh gear 133e. The seventh gear 133e drives the eighth gear 133f to rotate, and the eighth gear 133f rotates synchronously with the ninth gear 133g. The first gear 132 is fixed, and the ninth gear 133g rotates with respect to the first gear 132 so as to drive the entire first gear set 133 to rotate.

Furthermore, the number of teeth of the sixth gear 133d is more than the number of teeth of the fifth gear 133c, so the rotation speed of the sixth gear 133d is lower than the rotation speed of the fifth gear 133c to serve as the first stage of deceleration. The sixth gear 133d and the seventh gear 133e are coaxially arranged, so the rotation speed of the sixth gear 133d is equal to the rotation speed of the seventh gear 133e. The number of teeth of the sixth gear 133d is more than the number of teeth of the seventh gear 133e, and the number of teeth of the eighth gear 133f is more than the number of teeth of the seventh gear 133e, so the rotation speed of the eighth gear 133f is lower than the rotation speed of the seventh gear 133e to serve as the second stage of deceleration.

The above-mentioned two-stage deceleration design can overcome or compensate for the stroke difference between the rotation amount and the lift amount of the second axis 136, so as to facilitate smooth rotation and sliding of the second body 120 with respect to the first body 110.

On the other hand, the eighth gear 133f and the ninth gear 133g are coaxially arranged, so the rotation speed of the eighth gear 133f is equal to the rotation speed of the ninth gear 133g. The number of teeth of the eighth gear 133f is more than the number of teeth of the ninth gear 133g, and the number of teeth of the first gear 132 is more than the number of teeth of the ninth gear 133g, so as to provide sufficient rotation amount of the ninth gear 133g.

As shown in FIGS. 3A and 3B, the bracket 135 includes a sliding groove 135b parallel to the gear rack portion 135a, and the gear rack 134 is disposed in the sliding groove 135b. For example, the bracket 135 includes two gear rack portions 135a, which are symmetrically disposed on opposite sides of the sliding groove 135b. As shown in FIGS. 2A and 2B, the first body 110 includes a receiving space 112 for accommodating the hinge mechanism 130; as the second body 120 rotates with respect to the first body 110, the hinge mechanism 130 partly moves out of the receiving space 112 or moves back into the receiving space 112.

In summary, while the second body rotates with respect to the first body, the second body slides with respect to the first body to adjust the distance between the lower end of the second body and the back end of the first body. Furthermore, when the second body rotates and unfolds with respect to the first body through the hinge mechanism, the lower end of the second body slides away from the back end of the first body to prevent the lower end of the second body from blocking the heat dissipation path located on the back end of the first body (that is, the path through which the hot air inside the first body is discharged to the outside), such that the hot air is quickly discharged from the inside of the first body to the outside. Therefore, the portable electronic device of the disclosure has excellent heat dissipation efficiency.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A portable electronic device, comprising:
   a first body;
   a second body; and
   a hinge mechanism, wherein the second body is connected to the first body through the hinge mechanism, and the hinge mechanism comprises a basis axis located on the first body and a rotation axis located on a lower end of the second body, and when the second body rotates and unfolds with respect to the first body, the rotation axis slides along an arc shaped path with respect to the basis axis so as to increase a distance between the rotation axis and the basis axis, and the rotation axis sinks with respect to the basis axis.

2. The portable electronic device according to claim 1, wherein the rotation axis rotates with the second body with respect to the basis axis during the second body rotating with respect to the first body.

3. The portable electronic device according to claim 1, wherein the rotation axis and the basis axis are parallel to each other.

4. The portable electronic device according to claim 1, wherein a vertical drop is generated between the basis axis and the rotation axis during the second body rotating and unfolding with respect to the first body.

5. The portable electronic device according to claim 1, wherein the hinge mechanism comprises:
   a first axis, fixed in the first body; and
   a second axis, fixedly connected to a lower end of the second body, wherein the basis axis passes through the first axis and the rotation axis passes through the second axis.

6. The portable electronic device according to claim 5, wherein the second axis rotates with the second body with respect to the first axis during the second body rotating with respect to the first body.

7. The portable electronic device according to claim 5, wherein the hinge mechanism further comprises:
a first gear, fixed to the first axis;
a first gear set, engaged with the first gear;
a gear rack, rotatably connected to the first axis;
a bracket, slidably connected to the gear rack, wherein the bracket comprises a gear rack portion parallel to the gear rack, and the first gear set is engaged with the gear rack portion, wherein the second axis is rotatably connected to the bracket;
a second gear, fixed to the second axis; and
a second gear set, engaged with the second gear and the gear rack,
wherein when the second axis rotates with the second body with respect to the first body, the second gear drives the second gear set to rotate, and the second gear set slides with respect to the gear rack, such that the second axis slides along an arc shaped path with respect to the first axis so as to increase a distance between the second axis and the first axis, and the second axis sinks with respect to the basis axis.

8. The portable electronic device according to claim 7, wherein the bracket slides synchronously with the second axis, and the gear rack portion drives the first gear set to rotate.

9. The portable electronic device according to claim 7, wherein the bracket comprises a sliding groove parallel to the gear rack portion, and the gear rack is disposed in the sliding groove.

10. The portable electronic device according to claim 7, wherein the first gear set comprises a third gear engaged with the gear rack portion of the bracket; a fourth gear engaged with the third gear; a fifth gear coaxial with the fourth gear; a sixth gear engaged with the fifth gear; a seventh gear coaxial with the sixth gear; a eighth gear engaged with the seventh gear; and a ninth gear coaxial with the eighth gear, and the ninth gear is engaged with the first gear.

11. The portable electronic device according to claim 10, wherein the second gear set comprises a tenth gear engaged with the second gear and an eleventh gear engaged with the tenth gear, and the eleventh gear is engaged with the gear rack.

12. The portable electronic device according to claim 11, wherein a rotation direction of the third gear is opposite to a rotation direction of the eleventh gear.

13. The portable electronic device according to claim 10, wherein a number of teeth of the sixth gear is more than a number of teeth of the seventh gear and more than a number of teeth of the fifth gear.

14. The portable electronic device according to claim 10, wherein a number of teeth of the eighth gear is more than a number of teeth of the ninth gear.

15. The portable electronic device according to claim 10, wherein a number of teeth of the sixth gear is more than a number of teeth of the seventh gear; and a number of teeth of the eighth gear is more than the number of teeth of the seventh gear, and a number of teeth of the eighth gear is more than the number of teeth of the ninth gear, and a number of teeth of the first gear is more than the number of teeth of the ninth gear.

16. The portable electronic device according to claim 7, wherein the first body comprises a receiving space for accommodating the hinge mechanism, and as the second body rotates with respect to the first body, the hinge mechanism partly moves out of the receiving space or moves back into the receiving space.

17. The portable electronic device according to claim 7, wherein a distance between the second gear and the first gear is increased during the second body rotating and unfolding with respect to the first body.

18. The portable electronic device according to claim 7, wherein a distance between the second gear set and the first gear set is increased during the second body rotating and unfolding with respect to the first body.

\* \* \* \* \*